(12) United States Patent
Jaeger

(10) Patent No.: US 9,266,263 B1
(45) Date of Patent: Feb. 23, 2016

(54) GLOVE PALM CONSTRUCTION AND METHOD FOR FABRICATING THE PALM CONSTRUCTION

(75) Inventor: Eric M. Jaeger, El Segundo, CA (US)

(73) Assignee: Ironclad Performance Wear Corp., Farmers Branch, TX (US)

( * ) Notice: Subject to any disclaimer, the term of this patent is extended or adjusted under 35 U.S.C. 154(b) by 1026 days.

(21) Appl. No.: 13/385,666

(22) Filed: Mar. 1, 2012

(51) Int. Cl.
*B29C 43/20* (2006.01)

(52) U.S. Cl.
CPC ..................................... *B29C 43/20* (2013.01)

(58) Field of Classification Search
CPC .... B29C 59/005; B29C 59/02; B29C 59/026; B29C 43/203; B29C 43/20; B29C 2043/022; B29C 2043/023; B29C 2043/146; B29C 2043/147
USPC ............ 264/255, 293; 2/159, 161.6, 167, 169
See application file for complete search history.

(56) References Cited

U.S. PATENT DOCUMENTS

2008/0242176 A1 * 10/2008 Jaeger et al. .................. 442/139
2011/0055995 A1 * 3/2011 Dassler et al. ................. 2/161.1

FOREIGN PATENT DOCUMENTS

WO    WO 2010007538 A1 * 1/2010

* cited by examiner

*Primary Examiner* — Christina Johnson
*Assistant Examiner* — Xue Liu
(74) *Attorney, Agent, or Firm* — Amster, Rothstein & Ebenstein LLP

(57) ABSTRACT

A method for fabricating the palm portion of a glove wherein the top surface of a leather material is treated with polytetrafluoroethylene (PTFE). A layer of silicone is then applied to the leather surface, the silicone penetrating into the material to a predetermined depth, and the resultant assembly is then operated on in a manner to form raised portions and wells in the top and bottom surface of the assembly. The wells in the bottom surface of the assembly are then filled with silicone.

26 Claims, 3 Drawing Sheets

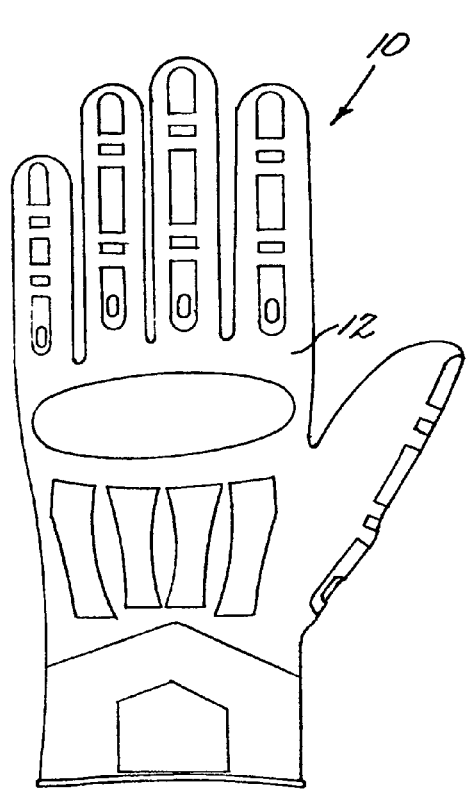
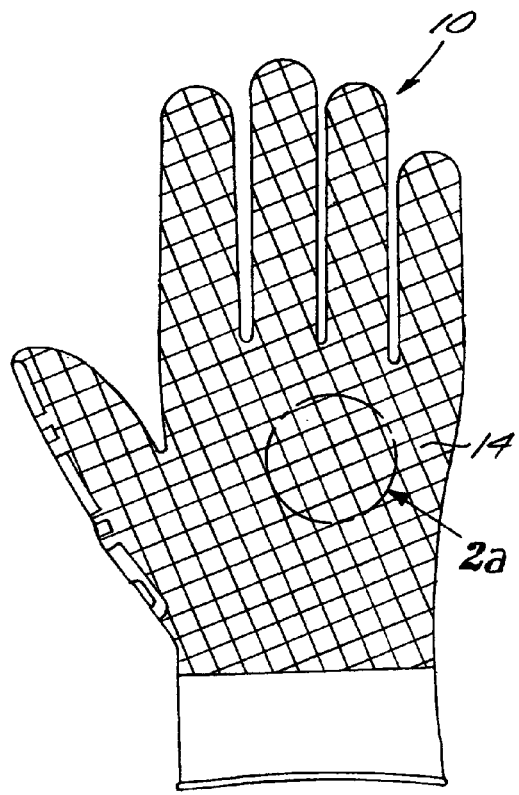
FIG. 1a      FIG. 1b
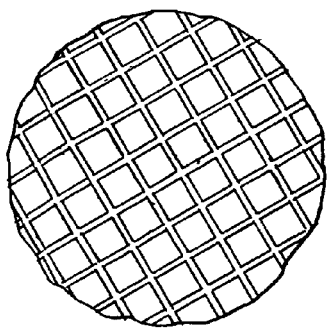
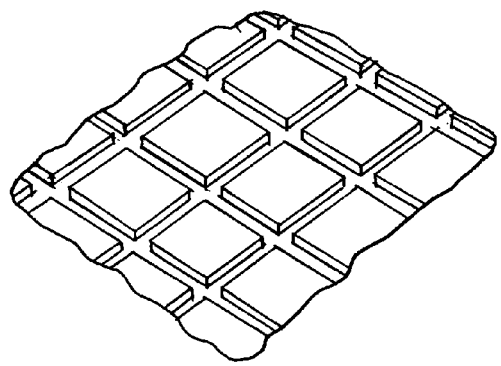
FIG. 2a      FIG. 2b

GLOVE PALM CONSTRUCTION AND METHOD FOR FABRICATING THE PALM CONSTRUCTION

BACKGROUND OF THE INVENTION

1. Field of the Invention

The present invention relates to work gloves in the oil and gas industries and, in particular, an improved palm material for the gloves.

2. Description of the Prior Art

Prior art gloves for use in the oil and gas industries can be described in four categories—gloves with enhanced grip, gloves with enhanced oil resistance, gloves with waterproof and chemical resistant inserts, and chemical resistant gloves.

A. Enhanced Grip (description of features on glove palms)
1. Knit gloves (cotton, polyester, nylon) with raised polyvinyl chloride (PVC) dots, or other polymer dots.
2. Synthetic leather with raised PVC dots.
3. Silicone or other polymer deposited onto surface of synthetic leather, in specific patterns (the silicone or other polymer does not penetrate the surface, it is raised above the surface for grip).
4. Embossed leather (or synthetic leather).
5. Etched leather (or synthetic leather).
6. Polymer-coated synthetic leather, with textured surface.
7. Polymer dots deposited onto knit or woven substrate.
8. Silicone dots deposited onto ceramic plates (the plates are adhered to a fabric substrate).

B. Enhanced Oil Resistance (description of features on glove palms)
9. Polyurethane membrane laminated to inner side of synthetic leather.
10. Silicone penetrated into outer surface of synthetic or natural leather described in pending application Ser. No. 11/731,061.
11. Spray or dip coating of polytetrafluoroethylene (PTFE) dispersant.
12. Spray coating of fluorosilicone dispersant.
13. Plasma chamber deposition of oil resistant polymer (such as fluorosilicone).
14. Tanning enhancements for natural leather C. Gloves with a waterproof and chemical resistant insert, positioned interior of the glove shell.

D. Chemical resistant gloves, lined or unlined. The exterior of the glove consisting of complete coverage of an oil resistant polymer, such as polyurethane, viton, butyl, nitrile, natural rubber, polyvinylchloride, chloroprene, etc.

Although the gloves that fall into any of these categories have advantages associated therewith, what is desired is to provide a glove having a palm material which provides both optimum grip and protection while working with high levels of oil, mud, lubricants and drilling fluids.

SUMMARY OF THE INVENTION

The present invention provides an improved glove palm material which provides optimum grip and protection while working with high levels of oil, mud, lubricants and drilling fluids. This is accomplished using a new palm material that is a hybrid composite of durable yet flexible oil-resistant polymers and breathable, washable, grip-enhancing microfibers. This blend is then molded into a pattern that channels fluids away from the palmar surface of the glove, ensuring optimum grip and control at all times. Heat resistance in the palm is an additional benefit.

This formulation improves upon the glove palm material disclosed in the '061 application for the following reasons:
1. The addition of PTFE and/or fluorosilicone to provide oil resistance, a step which is performed prior to the addition of silicone to the outer surface of a base material;
2. The three dimensional molded pattern with raised sections (and resultant channels); and
3. Silicon or other polymer used on the bottom side of the base material to fill in the cavities and provide mechanical support to the deformed fabric, setting the glove material into its molded shape.

DESCRIPTION OF THE DRAWINGS

For a better understanding of the present invention as well as other objects and further features thereof, reference is made to the following description which is to be read in conjunction with the accompanying drawing wherein:

FIGS. 1a and b illustrate the back and front views, respectively, of a glove incorporating the features of the present invention;

FIGS. 2a and 2b illustrate the top and orthogonal views of the palm pattern of the present invention;

DESCRIPTION OF THE INVENTION

Figure 3:
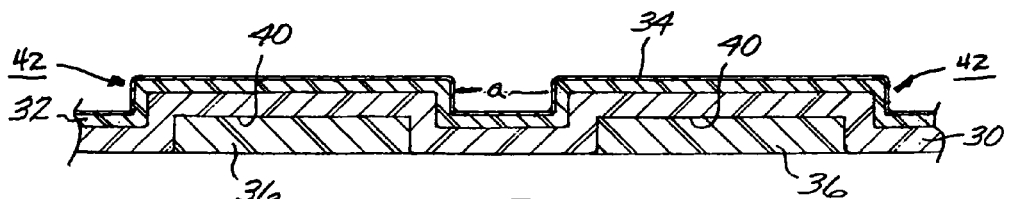
FIG. 3 is a side cross-sectional view illustrating the materials used in the glove palm of the present invention.

FIG. 1(a) illustrates the back portion of a glove 10 incorporating the hybrid polymer technology of the present invention. The design of back portion 12 is similar to that disclosed in pending application Ser. No. 12/284,256, filed Sep. 19, 2008, the teachings of which necessary to the understanding of the present invention being incorporated herein by reference. FIG. 1(b) illustrates the assembly of materials fabricated in accordance with the teachings of the present invention and designed for use as the palm material 14 for glove 10. The palm material is a hybrid composite blend of durable yet flexible oil-resistant polymers and breathable, washable, grip-enhancing microfibers. As will be discussed hereinafter, the blend is molded into a pattern that channels fluids away from the palmar surface of glove 10, providing optimum grip and control properties and also heat resistant capabilities.

The glove palm of the present invention is assembled as follows:

An approximately 1.0 mm thick leather base material (synthetic or natural leather) has its entire outer surface treated with Polytetrafluoroethylene (PTFE), such as DuPont Teflon, by spray or dip treatment. The PTFE layer thus formed is then heat cured. The treated outside surface of the base layer outer surface is then treated with silicone such that silicone penetrates below the surface of the synthetic or natural leather (typical penetration depths range between 0.05 mm and 0.5 mm) and the silicone is then heat cured. The resultant assembly is then molded into a three dimensional pattern, with raised surfaces and depressed channels (preferably performed with two machine-fabricated metal plates, pressed together around the leather base layer with or without heat). The inner, or lower, surface of the base layer is then coated with silicone such that the recesses, or cavities, formed on the inner surface are filled and the silicone penetrates the surface of the inner layer to a depth in the range between 0.05 mm and 0.5 mm. The silicone material is then heat cured. Although the raised surfaces on the outer surface are illustrated as being shaped as squares, other shapes can be used. In addition, the channels can be of various widths and depths (the dimensions can be tailored to the specific requirements of the intended environment and the visual characteristics desired). The resultant assembly incorporates the best characteristics of A) the polymers (oil, water, and heat resistance); B) the ability to be molded to specific shapes and hold its shape after curing, and C) the microfiber substrate—either synthetic or natural leather (high durability; abrasion, tear and puncture resistance; enhanced grip). Due to the application of a molded polymer on the inner surface, the resultant glove palm holds its shape (unlike embossed fabric). When using silicone (a thermoset polymer) on the inner surface, the resultant product will also hold its shape in the presence of heat. This process results in a material that is significantly different from embossed synthetic or natural leather. In particular, fabric that has been embossed creates compressed zones; over a period of time the compressed fabric typically reverts back to its original state resulting in lower resistance to abrasion. The palm material of the present invention avoids this problem.

The blend of oil resistant polymers and microfibers is created in a similar fashion to that disclosed in the '061 application and builds upon the technology developed therein. As noted, there are several methods of creating the blend of oil resistant polymers and microfibers. The preferred method is to start with a compressed nonwoven microfiber substrate, or base layer, with or without a polymer binder (typically referred to as synthetic leather or synthetic suede); then applying liquid PTFE with either a spray or dip coating to the outer surface and heat curing the coating material. The outer surface of the material is then impregnated with silicone and heat cured (120-200 C, 20-150 seconds). The result is a material assembly that incorporates microfibers, typically nylon, and a blend of silicone and PTFE polymers.

The surface is molded into a specific pattern by starting with the blended material resulting from the above mentioned step. The material is placed between two metal plates, the metal plates having been machined with the inverse of the top and bottom final patterns of the material. The plates are pressed together around the material, with or without heat. The bottom plate is removed and the bottom surface of the material is coated with silicone, such that the silicone penetrates the surface of the fabric and also fills the resultant wells, or cavities. The silicone is then heat cured (120-200 C.°, 20-150 seconds). Note that other patterns with raised portions and channels can be selected other than the pattern shown in the figures.

As noted, the glove palm surface contains raised and lowered surfaces. The lowered surfaces are all connected, forming channels that extend in all directions. Liquid will tend to draw into the channels due to gravity, surface tension and also the effect of getting pushed off the raised surface when a user handles tools and equipment. This prevents the liquid from pooling on the glove palm surface.

The curing time and temperature ranges set forth can vary depending on the type of silicone compound used, viscosity, inclusion of other agents, etc.

The dimensions of the palm material produced by the process of the present invention are a function of the base material thickness and the dimensions of the forming plates.

The palm portion formed in accordance with the teachings of the present invention is joined to the back portion of the glove preferably by sewing, although bonding can be accomplished by thermal or sonic welding, taping, adhesives and combinations thereof.

FIG. 3 is a simplified sectional side view of the palm portion of the glove formed in accordance with the teachings of the present invention.

In particular, the assembly comprises base material 30 (such as clarino synthetic leather manufactured by Kuraray Co., Ltd., Kurashiki City, Japan), silicone-penetrated base material layer 32, PTFE coating, or layer, 34 and silicone (or other soft polymer) material 36 filling the cavities, or wells, 40 on the inner surface of base material 30.

The height (thickness) of the finished palm ranges between 1.5 mm and 2.5 mm, the width a between raised portions 42 ranges between 1.0 and 2.0 mm, the distance between adjacent gaps, or channels, ranges between 7.0 and 9.0 mm and the thickness of the silicone, PTFE and base material 30 ranges between 0.5 mm and 1.5 mm. These are the preferred dimensions, but can vary according to the desired final effects and environments.

After the PTFE is cured, fluorosilicone can be used in place of the silicone to penetrate the material surface. Note that this would be applied in a different formula than set forth hereinabove. In particular, in lieu of spray or dip, a 2-part suspension is utilized in the same manner and with silicone. Fluorosilicone can also be used in place of the silicone without the need for PTFE.

Figure 4A:
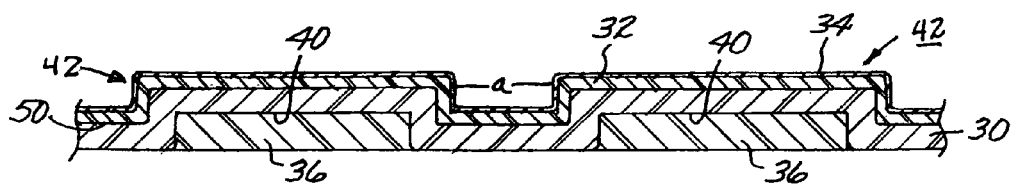
FIGS. 4(a)-4(c) are cross-sectional views illustrating alternative material compositions used in the glove palm of the present invention.
Figure 4B:
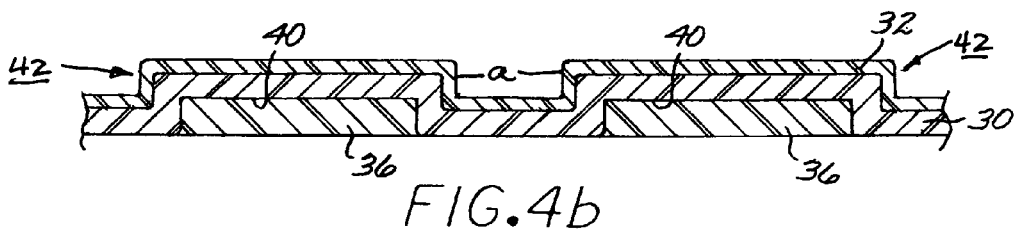
Figure 4C:
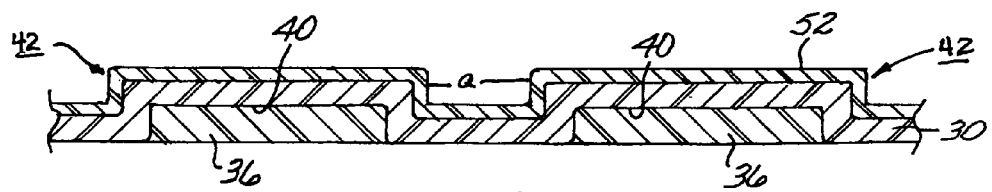

FIGS. 4(a)-4(c) illustrate alternative material compositions for the glove palm portion of the present invention.

FIG. 4(a) illustrates the top surface of the material as consisting of a layer of Fluorosilicone 50 (spray, wet drip, or plasma application) and silicone layer 32 (penetrating the surface) and differs from the preferred version which has a PTFE coating and a silicone layer applied after the PTFE coating.

FIG. 4(b) shows the top surface of the base material 30 consisting of a layer of silicone 32 only which penetrates the surface of base layer 30. This differs from the preferred version, which has a PTFE coating and a silicone layer applied after the PTFE coating.

FIG. 4(c) shows the top surface of the material consisting of a Fluorosilicone two-part suspension 52 which penetrates the upper surface of the base material 30. This differs from the preferred version, which has a PTFE coating and a layer of silicone applied over the PTFE coating. For this alternate construction, the Fluorosilicone penetrates the top surface of the material in the same fashion as the silicone 32 of the preferred version.

FIGS. 5(a)-5(e) illustrate the steps utilized to fabricate the preferred version of the glove palm portion of the present invention.

Figure 5A:
FIGS. 5(a)-5(e) illustrate the steps utilized to fabricate a glove palm in accordance with the teachings of the present invention.

Referring to FIG. 5(a), a thin layer of synthetic or natural leather base material 30 is provided. As noted hereinabove, synthetic leather typically is formed of compressed, nonwoven, nylon microfiber structure with a polyurethane binder. Typical formulations are:

1. 60% nylon microfiber, 40% polyurethane binder;
2. 60% polyester microfiber, 40% polyurethane binder;
3. 65% poly(ethylene terephthalate microfiber); 35% polyurethane binder;
4. 99% nylon microfiber; 1% polyurethane binder.

The synthetic or natural leather can be non-dyed or dyed (colorant added).

Figure 5B:
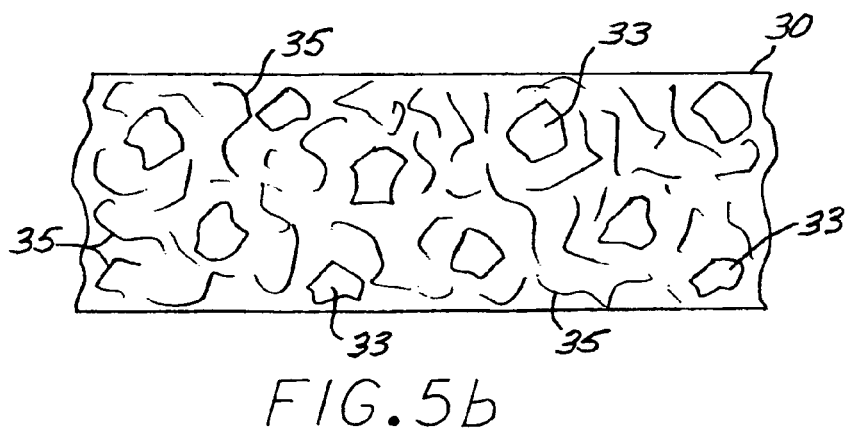

FIG. 5(b) is a typical cross-sectional view of base material 30 showing interspersed polyurethane binder 33 and entangled microfibers 35.

Figure 5C:
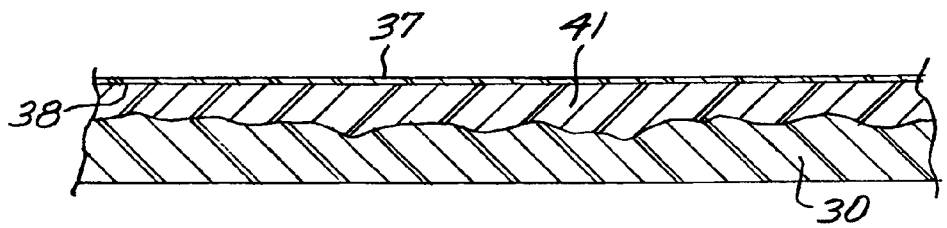

FIG. 5(c) illustrates base material 30 after the application of a polytetrafluoroethylene (PTFE, commercially sold under the TEFLON® mark) thin layer 37 to the top, or outer, surface 41 of base material 30. The PTFE material can be applied by a spray application or by dipping and is applied in liquid form. After application the PTFE layer is heat cured.

The next step involves applying a silicone polymer, in liquid form, to surface 38 as shown in FIG. 5(c). The silicone material 40 bleeds through (penetrates) the surface 38 and becomes part of the internal matrix of base material 30 forming a further modified base material 30. The PTFE layer 36 remains on surface 38 after the silicone application, the silicone securing the PTFE in place.

The silicone portion of this modified base material is then heat cured.

Figure 5D:
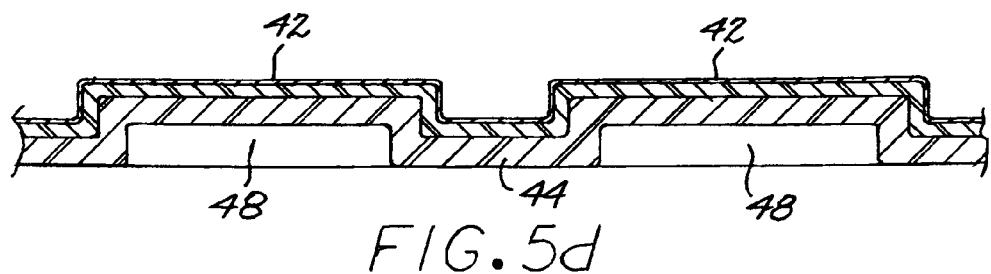

The modified base material is then further processed whereby raised portions 42 and lowered portions 44 are formed on the top and bottom surfaces, respectively, as shown in FIG. 5(d). The raised and lower portions are typically formed using heat and compression with metal plates on the top and bottom surfaces of the modified base material, the plates having the negative surface features to form the desired raised and lowered portions of the modified base material.

Figure 5E:
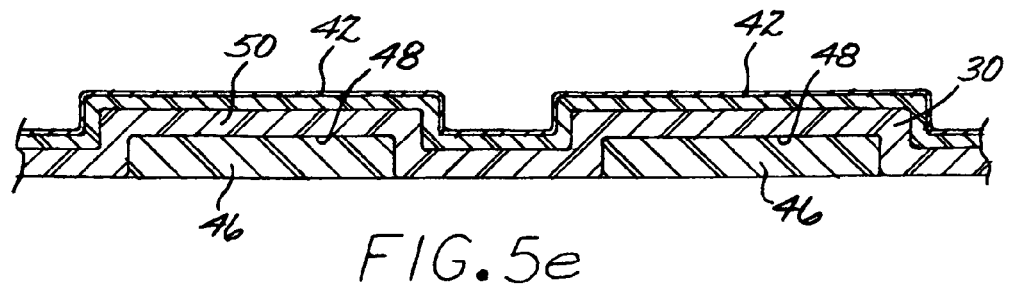

The final step of the glove palm fabrication process is the application of silicone polymer 46 to the inner surface of the modified base layer 30 as shown in FIG. 5(e). In particular, the silicone material 46 fills the open wells 48 formed on the inner surface of the modified base layer 30. The silicone also penetrates the inner surface of the base material 30 as represented by reference numeral 50. The silicon is then heat cured.

Silicone in the wells provides structural support to the raised portions 42 of the base material 30, the silicone penetration 50 into the inner surface of the base material 30 enhancing the oil and heat resistance of the palm material.

The glove palm portion formed in accordance with the teachings of the present invention is then sized and joined with the glove back portion in a manner described in the '256 application noted hereinabove.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A method of fabricating a palm portion of a glove comprising the steps of:
   providing a base material having first and second surfaces;
   applying a first material layer to said first surface of said base material;
   applying a second material to said first material layer, said second material penetrating said first surface of said base material into the base material forming an assembly, said assembly having first and second surfaces;
   acting on said assembly such that alternating raised and depressed shapes are formed on said first and second surfaces of said assembly, a raised portion on the first surface of said assembly corresponding to a depressed portion on the second surface of said assembly, a raised portion on the second surface of said assembly corresponding to a depressed portion on the first surface of said assembly; and
   filling in the depressed portions formed on the second surface of said assembly with a third material.

2. The method of claim 1 wherein said base material comprises leather.

3. The method of claim 2 wherein said leather material comprises synthetic leather.

4. The method of claim 1 wherein said third material comprises silicone.

5. The method of claim 1 wherein said second material comprises silicone.

6. The method of claim 1 wherein said first material comprises polytetrafluoroethylene.

7. The method of claim 1 further comprising the step of adding a flame retardant material is added to said assembly.

8. The method of claim 1 further comprising the step of adding a colorant to said second material.

9. The method of claim 1 wherein the shape of the raised and depressed portions on said first surface of said assembly are rectangular in shape.

10. The method of claim 1 wherein the shape of the raised and depressed portions on said first surface of said assembly are diamond in shape.

11. The method of claim 1 wherein the raised and depressed portions on said first surface of said assembly are hexagonal in shape.

12. The method of claim 1 wherein the raised and depressed portions on said first surface of said assembly are oval in shape.

13. The method of claim 1 wherein the depressed portions on said first surface of said assembly are connected and continuous.

14. The method of claim 1 wherein the raised portions on said first surface of said assembly are substantially the same height.

15. The method of claim 1 wherein the height of said raised portions are in the range between 0.2 and 2.0 mm above the level of the depressed portions.

16. The method of claim 1 in which the raised and depressed portions of said first surface substantially covers said first surface of said assembly.

17. The method of claim 2 wherein said leather material comprises natural leather.

18. A method of fabricating a palm portion of a glove comprising the steps of:
   providing a base material having first and second surfaces;
   applying a first material to said first surface of said base material, said first material penetrating said first surface of said base material into the base material forming an assembly, said assembly having first and second surfaces;
   acting on said assembly such that alternating raised and depressed shapes are formed on said first and second surfaces of said assembly, a raised portion on the first surface of said assembly corresponding to a depressed portion on the second surface of said assembly, a raised portion on the second surface of said assembly corresponding to a depressed portion on the first surface of said assembly; and
   filling in the depressed portions formed on the second surface of said assembly with a second material.

19. The method of claim 1 wherein said first material comprises Fluorosilicone.

20. The method of claim 19 wherein said second material comprises Fluorosilicone.

21. The method of claim 1 wherein said second materials comprises Fluorosilicone.

22. The method of claim 1 wherein said third material comprise Fluorosilicone.

23. The method of claim 18 wherein said first material comprises Fluorosilicone.

24. The method of claim 18 wherein said second materials comprises Fluorosilicone.

25. The method of claim 18 wherein said first material comprises silicone.

26. The method of claim 18 wherein said second material comprises silicone.

* * * * *